(12) United States Patent
Lim et al.

(10) Patent No.: US 10,904,522 B2
(45) Date of Patent: Jan. 26, 2021

(54) APPARATUS AND METHOD FOR VIDEO ENCODING OR DECODING USING INTRA-PREDICTING DIAGONAL EDGES

(71) Applicant: SK TELECOM CO., LTD., Seoul (KR)

(72) Inventors: Jeong-yeon Lim, Seoul (KR); Sun-young Lee, Seoul (KR); Se-hoon Son, Seoul (KR); Jae-seob Shin, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 16/476,847

(22) PCT Filed: Jan. 9, 2018

(86) PCT No.: PCT/KR2018/000380
§ 371 (c)(1),
(2) Date: Jul. 9, 2019

(87) PCT Pub. No.: WO2018/128511
PCT Pub. Date: Jul. 12, 2018

(65) Prior Publication Data
US 2019/0356913 A1 Nov. 21, 2019

(30) Foreign Application Priority Data

Jan. 9, 2017 (KR) .................. 10-2017-0003158
Jan. 8, 2018 (KR) .................. 10-2018-0002063

(51) Int. Cl.
*H04N 19/11* (2014.01)
*H04N 19/107* (2014.01)
(Continued)

(52) U.S. Cl.
CPC .......... *H04N 19/11* (2014.11); *H04N 19/107* (2014.11); *H04N 19/176* (2014.11); *H04N 19/70* (2014.11)

(58) Field of Classification Search
CPC .... H04N 19/107; H04N 19/11; H04N 19/119; H04N 19/14; H04N 19/159;
(Continued)

(56) References Cited

U.S. PATENT DOCUMENTS 10,516,884 B2 * 12/2019 Heo ............... H04N 19/117
2013/0177079 A1 * 7/2013 Kim ............... H04N 19/593
375/240.12
(Continued)

FOREIGN PATENT DOCUMENTS

KR 10-0571814 B1 4/2006
KR 10-2013-0005233 A 1/2013
(Continued)

OTHER PUBLICATIONS

International Search Report dated Apr. 6, 2018 in connection with counterpart Korean Patent Application No. PCT/KR2018/000380.

*Primary Examiner* — Jessica M Prince
(74) *Attorney, Agent, or Firm* — Hauptman Ham, LLP

(57) ABSTRACT

The present disclosure describes techniques that can be considered in intra-predicting diagonal edges that may be present in a block to be encoded. In the new intra mode proposed in the present disclosure, a prediction area is divided into two areas in the diagonal direction, and the areas can be predicted in different directions.

7 Claims, 25 Drawing Sheets

(51) Int. Cl.
*H04N 19/70* (2014.01)
*H04N 19/176* (2014.01)

(58) Field of Classification Search
CPC .. H04N 19/176; H04N 19/593; H04N 19/597; H04N 19/70
See application file for complete search history.

(56) References Cited

U.S. PATENT DOCUMENTS

| | | | |
|---|---|---|---|
| 2013/0188716 A1* | 7/2013 | Seregin | H04N 19/50 375/240.16 |
| 2014/0010295 A1 | 1/2014 | Lu et al. | |
| 2018/0098064 A1* | 4/2018 | Seregin | H04N 19/159 |
| 2019/0141319 A1* | 5/2019 | Moon | H04N 19/11 |

FOREIGN PATENT DOCUMENTS

| | | |
|---|---|---|
| KR | 10-1292093 B1 | 8/2013 |
| KR | 10-2014-0005257 A | 1/2014 |
| KR | 10-1629475 B1 | 6/2016 |
| WO | 2012100047 A1 | 7/2012 |

* cited by examiner

FIG. 8

| $R_{0,0}$ | $R_{1,0}$ | $R_{2,0}$ | ⋯ | $R_{N,0}$ | $R_{N+1,0}$ | ⋯ | | $R_{2N,0}$ |
|---|---|---|---|---|---|---|---|---|
| $R_{0,1}$ | $P_{1,1}$ | $P_{2,1}$ | ⋯ | $P_{N,1}$ | | | | |
| $R_{0,2}$ | $P_{1,2}$ | ⋱ | | ⋮ | | | | |
| ⋮ | ⋮ | | | | | | | |
| $R_{0,N}$ | $P_{1,N}$ | ⋯ | | $P_{N,N}$ | | | | |
| $R_{0,N+1}$ | | | | | | | | |
| ⋮ | | | | | | | | |
| $R_{0,2N}$ | | | | | | | | |

FIG. 10A

| $R_{0,0}$ | $R_{1,0}$ | $R_{2,0}$ | ⋯ | $R_{N,0}$ | $R_{N+1,0}$ | ⋯ | | $R_{2N,0}$ |
|---|---|---|---|---|---|---|---|---|
| $R_{0,1}$ | $P_{1,1}$ | $P_{2,1}$ | ⋯ | $P_{N,1}$ | | | | |
| $R_{0,2}$ | $P_{1,2}$ | | ⋮ | | | | | |
| ⋮ | ⋮ | | | | | | | |
| $R_{0,N}$ | $P_{1,N}$ | ⋯ | | $P_{N,N}$ | | | | |
| $R_{0,N+1}$ | | | | | | | | |
| ⋮ | | | | | | | | |
| $R_{0,2N}$ | | | | | | | | |

FIG. 10B

| $R_{0,0}$ | $R_{1,0}$ | $R_{2,0}$ | ... | $R_{N,0}$ | $R_{N+1,0}$ | ... | $R_{2N,0}$ |
|---|---|---|---|---|---|---|---|
| $R_{0,1}$ | $P_{1,1}$ | $P_{2,1}$ | ... | $P_{N,1}$ | | | |
| $R_{0,2}$ | $P_{1,2}$ | ⋱ | | ⋮ | | | |
| ⋮ | ⋮ | | | | | | |
| $R_{0,N}$ | $P_{1,N}$ | ... | | $P_{N,N}$ | | | |
| $R_{0,N+1}$ | | | | | | | |
| ⋮ | | | | | | | |
| $R_{0,2N}$ | | | | | | | |

FIG. 11A

| $R_{0,0}$ | $R_{1,0}$ | $R_{2,0}$ | ⋯ | $R_{N,0}$ | $R_{N+1,0}$ | ⋯ |
|---|---|---|---|---|---|---|
| $R_{0,1}$ | $P_{1,1}$ | $P_{2,1}$ | | | | |
| $R_{0,2}$ | $P_{1,2}$ | ⋱ | | | | |
| ⋮ | ⋮ | | | | | |
| $R_{0,N}$ | $P_{1,N}$ | ⋯ | | | | |
| $R_{0,N+1}$ | | | | | | |
| ⋮ | | | | | | |

FIG. 11B

| $R_{0,0}$ | $R_{1,0}$ | $R_{2,0}$ | ⋯ | $R_{N,0}$ | $R_{N+1,0}$ | ⋯ |
|---|---|---|---|---|---|---|
| $R_{0,1}$ | $P_{1,1}$ | $P_{2,1}$ | | | | |
| $R_{0,2}$ | $P_{1,2}$ | ⋱ | | | | |
| ⋮ | ⋮ | | | | | |
| $R_{0,N}$ | $P_{1,N}$ | ⋯ | | | | |
| $R_{0,N+1}$ | | | | | | |
| ⋮ | | | | | | |

APPARATUS AND METHOD FOR VIDEO ENCODING OR DECODING USING INTRA-PREDICTING DIAGONAL EDGES

CROSS-REFERENCE TO RELATED APPLICATION

This application is a US National Stage of International Application No. PCT/KR2018/000380, filed on Jan. 9, 2018, which is based upon and claims the benefit of priorities to Patent Application No. 10-2017-0003158, filed on Jan. 9, 2017 in Korea, and Patent Application No. 10-2018-0002063, filed on Jan. 8, 2018 in Korea, the entire content of which is incorporated herein by reference.

TECHNICAL FIELD

The present invention relates to efficiently encoding or decoding video. More particularly, the present invention relates to intra prediction techniques which are usefully operable in blocks that have diagonal edges or different diagonal textures.

BACKGROUND

The statements in this section merely provide background information related to the present disclosure and may not constitute prior art.

Joint exploration model (JEM), which is a reference SW codec of the joint video exploration team (JVET) that is conducting research on next-generation video standard technology, provides a coding unit (CU) in a recursive split structure of QTBT (quadtree plus binary tree). QTBT is used to eliminate redundancy of coding block structure concepts of CU, prediction unit (PU) and transform unit (TU) in high efficiency video coding (HEVC) and employs a block structure having more flexible and diverse CU structures such as a non-square shape.

The JVET is studying the need to include a 360 degree video coding technique in the next generation video coding standard. 360-degree video (hereinafter referred to as a "360 video") is images captured in various directions using a plurality of cameras or an omnidirectional camera. In order to compress and transmit video of various scenes, images captured in various directions are stitched into one 2D image. The stitched image is compressed and transmitted to a decoding apparatus. The decoding apparatus decodes the compressed image and then maps the decoded image to a 3D space to reproduce the image.

A representative projection format for 360 video is equirectangular projection (EPR). The EPR format has drawbacks of excessively increasing pixels in the upper and lower portions of a 360 image having a 3D spherical shape, which results in severe distortion, and increasing the amount of data and the encoding throughput of the increased portions when the image is compressed. Accordingly, various projection formats that can replace the EPR format have been proposed.

When an icosahedral projection (ISP) image is unfolded in a 2D space, the unfolded image has a shape as shown in FIGS. 1A, 1B and 1C. FIG. 1A shows a general native layout, and FIG. 1B and FIG. 1C show two kinds of compact layouts. All three types illustrated in FIGS. 1A, 1B and 1C include many diagonal edges due to the characteristics of the icosahedron, which is made up of triangular faces. FIG. 2 shows a compact layout of the octahedron projection (OHP) map of 360 video. As shown in FIG. 2, a region in which one block has two faces occupies a large portion of the image. Accordingly, applying one intra mode to CUs having a rectangular shape or a square shape as exemplarily shown in FIG. 2 may reduce spatial compression efficiency.

SUMMARY

It is one object of the present disclosure to provide intra prediction techniques which are usefully operable in blocks that have diagonal edges or different diagonal textures. In the intra prediction techniques of the present disclosure, adding a new intra mode called a "split intra mode" to existing intra modes is considered. In the split intra mode, a predicted area is diagonally divided into two areas, and each of the divided areas may be predicted in a separate directional or non-directional mode.

In accordance with one aspect of the present invention, provided is a method for decoding video data, including decoding syntax elements defining an intra mode and a residual block of a current block of the video data from an encoded bitstream; determining the intra mode of the current block from among a plurality of available intra modes based on the decoded syntax elements defining the intra mode of the current block, the plurality of available intra modes comprising a plurality of directional modes, a plurality of non-directional modes, and at least one split intra mode; determining a prediction block for the current block based on the determined intra mode of the current block; and reconstructing the current block based on the prediction block and the residual block. Herein, in the split intra modes, respective one of the plurality of directional modes and the plurality of non-directional modes is individually applied to each of two areas divided by diagonally splitting the current block.

In accordance with another aspect of the present invention, provided is an apparatus for decoding video data, including a memory; and one or more processors, wherein the one or more processors are configured to perform operations of decoding syntax elements defining an intra mode and a residual block of a current block of the video data from an encoded bitstream; determining the intra mode of the current block from among a plurality of available intra modes based on the decoded syntax elements defining the intra mode of the current block, the plurality of available intra modes including a plurality of directional modes, a plurality of non-directional modes, and at least one split intra mode; determining a prediction block for the current block based on the determined intra mode of the current block; and reconstructing the current block based on the prediction block and the residual block.

BRIEF DESCRIPTION OF DRAWINGS

FIG. 8 is a diagram showing a positional relationship between a current block and reference samples in intra prediction.

FIGS. 10A and 10B are diagrams illustrating types of split intra modes applied to a square block.

FIGS. 11A and 11B are diagrams illustrating types of split intra mode applied to a rectangular block.

DETAILED DESCRIPTION

Figure 1A:
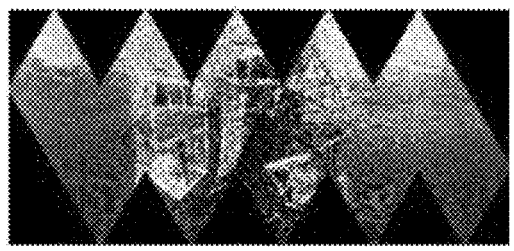
FIGS. 1A, 1B and 1C illustrate various two-dimensional layouts of icosahedral projection (ISP).
Figure 1B:
Figure 1C:
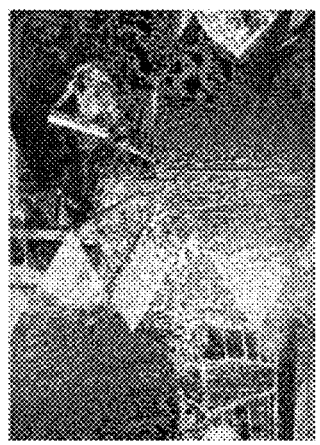

Hereinafter, some embodiments of the present invention will be described in detail with reference to the accompanying drawings. It should be noted that, in adding reference numerals to the constituent elements in the respective drawings, like reference numerals designate like elements, although the elements are shown in different drawings. Further, in the following description of the present invention, a detailed description of known functions and configurations incorporated herein will be omitted when it may make the subject matter of the present invention rather unclear.

Figure 3:
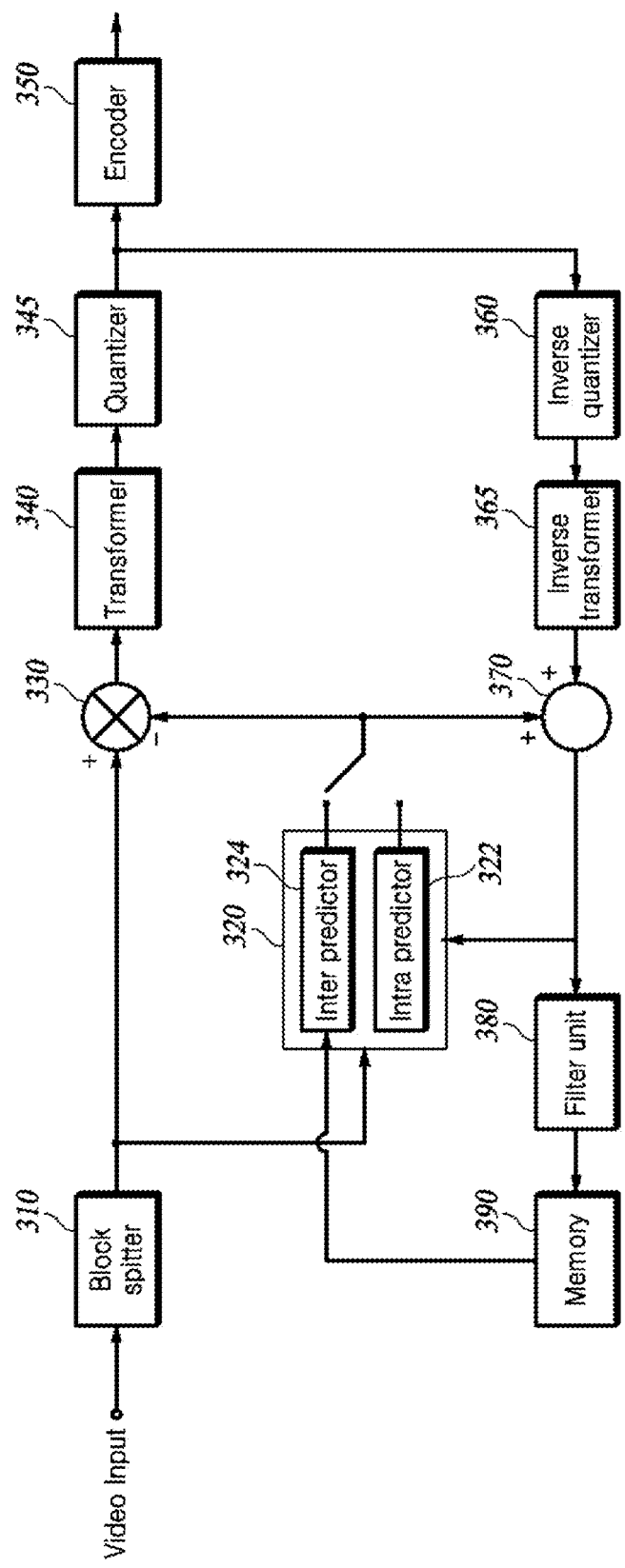
FIG. 3 is a block diagram of a video encoding apparatus in which techniques of the present disclosure can be implemented.

FIG. 3 is a block diagram of a video encoding apparatus in which techniques of the present disclosure can be implemented.

The video encoding apparatus includes a block splitter 310, a predictor 320, a subtractor 330, a transformer 340, a quantizer 345, an encoder 350, an inverse quantizer 360, an inverse transformer 365, an adder 370, a filter unit 380, and a memory 390. Each element of the video encoding apparatus may be implemented as a hardware chip, or may be implemented as software, and the microprocessor may be implemented to execute the functions of the software corresponding to the respective elements.

The block splitter 310 splits each picture constituting video into a plurality of coding tree units (CTUs), and then recursively splits the CTUs using a tree structure. A leaf node in the tree structure is a coding unit (CU), which is a basic unit of coding. A QuadTree (QT) structure, in which a node is split into four sub-nodes, or a QuadTree plus BinaryTree (QTBT) structure including the QT structure and a BinaryTree (BT) structure, in which a node is split into two sub-nodes, may be used as the tree structure.

In the QuadTree plus BinaryTree (QTBT) structure, a CTU can be first split according to the QT structure. Thereafter, the leaf nodes of the QT may be further split by the BT. The split information generated by the block splitter 310 by dividing the CTU by the QTBT structure is encoded by the encoder 350 and transmitted to the video decoding apparatus.

In the QT, a first flag (QT_split_flag) indicating whether to split a block of a corresponding node is encoded. When the first flag is 1, the block of the node is split into four blocks of the same size. When the first flag is 0, the node is not further split by the QT.

In the BT, a second flag (BT_split_flag) indicating whether to split a block of a corresponding node is encoded. The BT may have a plurality of split types. For example, there may be a type of horizontally splitting the block of a node into two blocks of the same size and a type of vertically splitting the block of a node into two blocks of the same size. Additionally, there may be another type of asymmetrically splitting the block of a node into two blocks. The asymmetric split type may include a type of splitting the block of a node into two rectangular blocks at a ratio of 1:3. In case where the BT has a plurality of split types as described above, the second flag indicating that the block is split is encoded, and the split type information indicating the split type of the block is additionally encoded.

Figure 4A:
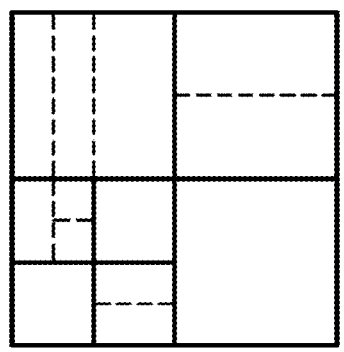
FIGS. 4A and 4B show a conceptual diagram of exemplary block splitting using a quadtree plus binary tree (QTBT) structure.
Figure 4B:
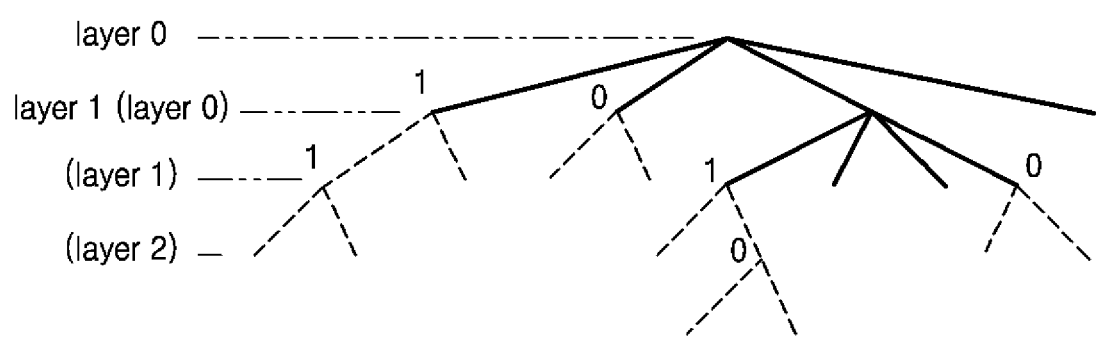

FIGS. 4A and 4B show an exemplary diagram of block splitting using a QTBT structure. FIG. 4A illustrates splitting a block by a QTBT structure, and FIG. 4B represents the splitting in a tree structure. In FIGS. 4A and 4B, the solid line represents split by the QT structure, and the dotted line represents split by the BT structure. In FIG. 4B, regarding notation of layers, a layer expression without parentheses denotes a layer of QT, and a layer expression in parentheses denotes a layer of BT. In the BT structure represented by dotted lines, the numbers are the split type information.

In FIGS. 4A and 4B, the CTU, which is the uppermost layer of QT, is split into four nodes of layer 1. Thus, the block splitter 310 generates a QT split flag (QT_split_flag=1) indicating that the CTU is split. A block corresponding to the first node of layer 1 is not split by the QT anymore. Accordingly, the block splitter 310 generates QT_split_flag=0.

Then, the block corresponding to the first node of layer 1 of QT is subjected to BT. In this embodiment, it is assumed that the BT has two split types: a type of horizontally splitting the block of a node into two blocks of the same size and a type of vertically splitting the block of a node into two blocks of the same size. The first node of layer 1 of QT becomes the root node of '(layer 0)' of BT. The block corresponding to the root node of BT is further split into blocks of '(layer 1)', and thus the block splitter 310 generates BT_split_flag=1 indicating that the block is split by the BT. Thereafter, the block splitter 310 generates split type information indicating whether the block is split horizontally or vertically. In FIGS. 4A and 4B, since the block corresponding to the root node of the BT is vertically split, '1' indicating vertical split is generated as split type information. Among the blocks of '(layer 1)' split from the root node, the first block is further split according to the vertical split type, and thus BT_split_flag=1 and the split type information '1' are generated. On the other hand, the second block of (layer 1) split from the root node of the BT is not split anymore, and thus BT_split_flag=0 is generated therefor.

Thus, in FIGS. 4A and 4B, since the above left block corresponding to the root node of the BT is vertically split, BT_split_flag set to 1, which indicates that splitting is performed by the BT, and split type information of 1, which indicates vertical splitting, are generated. In the case where the first block of the blocks of '(layer 1)' split from the root node of the BT is further split and the split type is horizontal split, BT_split_flag=1 and split type information of 0 will be generated. Then, in the case where the second block of (layer 1) from the root node of the BT is further split, the split type of the block should be vertical split. This is because, if the split type of the second block (layer 1) split from the root node of the BT is horizontal split, the block corresponding to the root node of the BT will take a form obtained through QT splitting. That is, in this case, the splitting should be represented by QT split information instead of BT split information. However, in this example, QT splitting of the block corresponding to the root node of the BT has already been completed, and therefore splitting of this type cannot be performed. Accordingly, the split type of the second block of '(layer 1)' split from the root node of the BT should be vertical splitting. Further, since the decoder can derive the split type information as 1, the split type information does not need to be signaled except BT_split_flag=1.

In order to efficiently signal the information on block splitting by the QTBT structure to the video decoding apparatus, the following information may be further encoded. These pieces of information, which are encoded as header information of a video, may be encoded into, for example, a sequence parameter set (SPS) or a picture parameter set (PPS).

CTU size: Block size of the uppermost layer, i.e., the root node, of the QTBT;
MinQTSize: Minimum block size of leaf nodes allowed in QT;
MaxBTSize: Maximum block size of the root node allowed in BT;
MaxBTDepth: Maximum depth allowed in BT;
MinBTSize: Minimum block size of leaf nodes allowed in BT.

In the QT, a block having the same size as MinQTSize is not further split, and thus the split information (first flag) about the QT corresponding to the block is not encoded. In addition, in the QT, a block having a size larger than MaxBTSize does not have a BT. Accordingly, the split information (second flag, split type information) about the BT corresponding to the block is not encoded. Further, when the depth of a corresponding node of BT reaches MaxBTDepth, the block of the node is not further split and the corresponding split information (second flag, split type information) about the BT of the node is not encoded. In addition, a block having the same size as MinBTSize in the BT is not further split, and the corresponding split information (second flag, split type information) about the BT is not encoded. By defining the maximum or minimum block size that a root or leaf node of QT and BT can have in a high level such as a sequence parameter set (SPS) or a picture parameter set (PPS) as described above, the amount of coding of information indicating the splitting status of the CTU and the split type may be reduced.

In an embodiment, the luma component and the chroma components of the CTU may be split using the same QTBT structure. However, the present invention is not limited thereto. The luma component and the chroma components may be split using different QTBT structures, respectively. As an example, in the case of an Intra (I) slice, the luma component and the chroma components may be split using different QTBT structures.

Hereinafter, a block corresponding to a CU to be encoded or decoded is referred to as a "current block".

The predictor 320 generates a prediction block by predicting a current block. The predictor 320 includes an intra predictor 322 and an inter predictor 324.

The intra predictor 322 predicts pixels in the current block using pixels (reference samples) located around the current block in a current picture including the current block. There are plural intra prediction modes according to the prediction directions, and the neighboring pixels to be used and the calculation equation to be used are defined differently according to each prediction mode. In particular, the intra predictor 322 may determine an intra mode to be used to encode the current block. In some examples, the intra-predictor 322 may encode the current block using several intra modes and select an appropriate intra mode to use from among the tested modes. For example, the intra-predictor 322 may calculate rate-distortion values using rate-distortion analysis for several tested intra modes, and select an intra mode having the best rate distortion characteristics among the tested modes.

Figure 5:
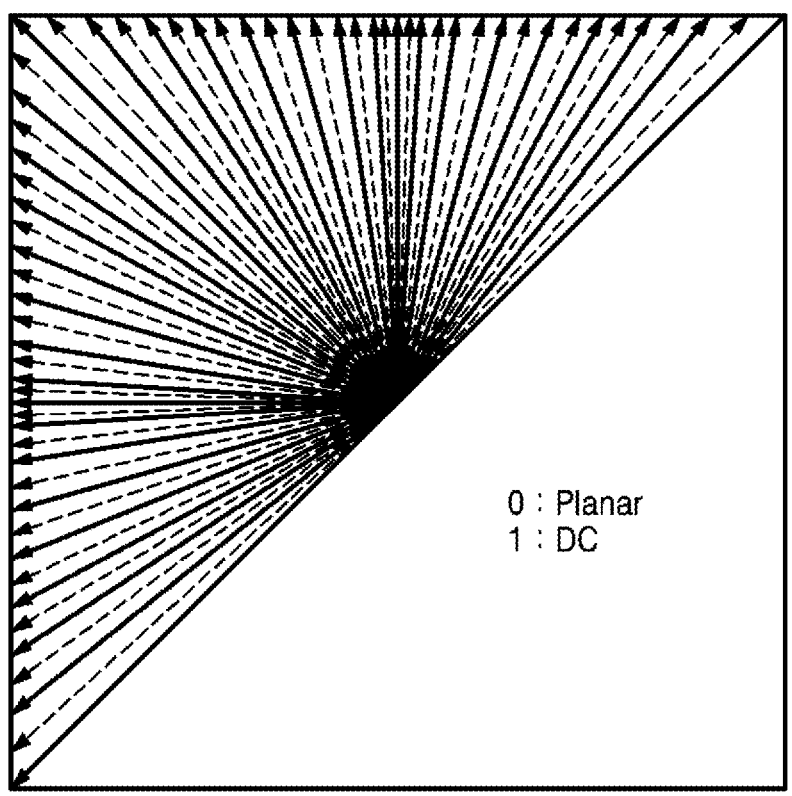
FIG. 5 is a conceptual diagram illustrating a plurality of intra modes available for intra prediction.

FIG. 5 is a conceptual diagram illustrating a plurality of intra modes available for intra prediction. As shown in FIG. 5, the plurality of intra prediction modes may include two non-directional modes (a planar mode and a DC mode) and 65 directional modes. In addition, as described below, the present disclosure proposes an additional intra mode suitable for intra prediction of blocks with diagonal edges. However, the number of directional and non-directional modes, the total number of intra modes, and the like are merely exemplary and various combinations are possible within the scope of the present invention.

The intra predictor 322 selects one intra mode from among the plurality of intra modes, and predicts the current block using neighboring pixels (which can be referred to as reference pixels or reference samples) and an equation determined according to the selected intra mode. The information about the selected intra prediction mode is encoded by the encoder 350 and transmitted to the video decoding apparatus.

In order to efficiently encode an intra mode information indicating which of the plurality of intra modes is used as the intra mode of the current block, the intra predictor 322 may determine some of the intra modes that are most likely to be used as the intra mode of the current block as the most probable modes (MPMs). Then, the intra predictor generates mode information indicating whether the intra mode of the current block is selected from among the MPMs, and transmits the mode information to the encoder 350. When the intra mode of the current block is selected from among the MPMs, the intra predictor transmits, to the encoder, first intra prediction information for indicating which mode of the MPMs is selected as the intra mode of the current block. On the other hand, when the intra mode of the current block is not selected from among the MPMs, second intra identification information for indicating which of the modes excluding the MPMs is selected as the intra mode of the current block is transmitted to the encoder.

Hereinafter, a method of constructing an MPM list will be described. While six MPMs are described as constituting the MPM list, the present invention is not limited thereto. The number of MPMs included in the MPM list may be selected within a range of three to ten.

Figure 6:
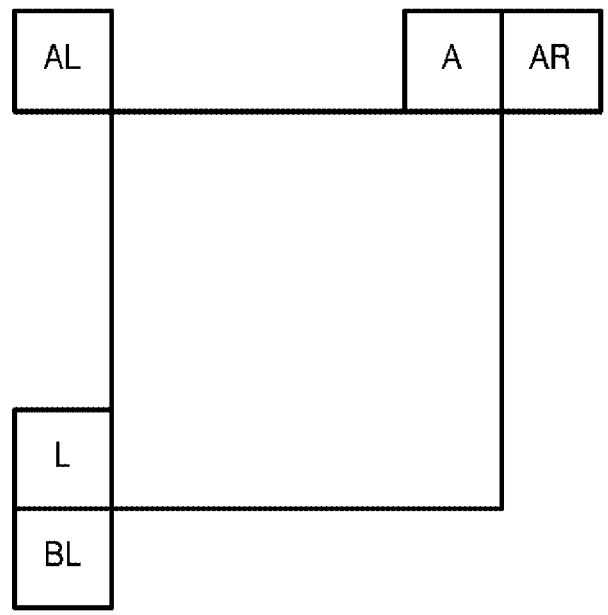
FIG. 6 is an exemplary diagram of neighboring blocks for a current block.

First, the MPM list is configured using intra modes of neighboring blocks for the current block. In an example, as shown in FIG. 6, the neighboring blocks may include a part or the entirety of a left block L, an above block A, a bottom left block BL, an above right block AR, and an above left block AL of the current block.

The intra modes of these neighboring blocks are included in the MPM list. Here, the intra modes of the available blocks are included in the MPM list in order of the left block L, the above block A, the bottom left block BL, the above right block AR, and the above left block AL, and candidates are configured by adding the planar mode and the DC mode to the intra modes of the neighboring blocks. Alternatively, available modes may be added to the MPM list in order of the left block L, the above block A, the planar mode, the DC mode, the bottom left block BL, the above right block AR, and the above left block AL. Alternatively, available modes may be added to the MPM list in order of the left block L, the above block A, the planar mode, the bottom left block BL, the above right block AR, the above left block AL, and the DC mode.

Only different intra modes are included in the MPM list. That is, when there are duplicated modes, only one of the duplicated modes is included in the MPM list.

When the number of MPMs in the list is less than a predetermined number (e.g., 6), the MPMs may be derived by adding −1 or +1 to the directional modes in the list. In addition, when the number of MPMs in the list is less than the predetermined number, modes are added to the MPM list in order of the vertical mode, the horizontal mode, the diagonal mode, and so on.

The inter predictor 324 searches for a block most similar to the current block in a reference picture encoded and decoded earlier than the current picture, and generates a prediction block for the current block using the searched block. Then, the inter predictor 324 generates a motion vector corresponding to a displacement between the current block in the current picture and the prediction block in the reference picture. Motion information including information about the reference picture used to predict the current block and information about the motion vector is encoded by the encoder 350 and transmitted to the video decoding apparatus.

The subtractor 330 subtracts the prediction block generated by the intra predictor 322 or the inter predictor 324 from the current block to generate a residual block.

The transformer 340 transforms residual signals in the residual block having pixel values in the spatial domain into transform coefficients in the frequency domain. The transformer 340 may transform the residual signals in the residual block by using the size of the current block as a transform unit, or may split the residual block into a plurality of smaller subblocks and transform residual signals in transform units corresponding to the sizes of the subblocks. There may be various methods of splitting the residual block into smaller subblocks. For example, the residual block may be split into subblocks of the same predefined size, or may be split in a manner of a quadtree (QT) which takes the residual block as a root node.

The quantizer 345 quantizes the transform coefficients output from the transformer 340 and outputs the quantized transform coefficients to the encoder 350.

The encoder 350 encodes the quantized transform coefficients using a coding scheme such as CABAC to generate a bitstream. The encoder 350 encodes information such as a CTU size, a MinQTSize, a MaxBTSize, a MaxBTDepth, a MinBTSize, a QT split flag, a BT split flag, and a split type associated with the block split such that the video decoding apparatus splits the block in the same manner as in the video encoding apparatus.

The encoder 350 encodes information about a prediction type indicating whether the current block is encoded by intra prediction or inter prediction, and encodes intra prediction information or inter prediction information according to the prediction type.

The inverse quantizer 360 inversely quantizes the quantized transform coefficients output from the quantizer 345 to generate transform coefficients. The inverse transformer 365 transforms the transform coefficients output from the inverse quantizer 360 from the frequency domain to the spatial domain and reconstructs the residual block.

The adder 370 adds the reconstructed residual block to the prediction block generated by the predictor 320 to reconstruct the current block. The pixels in the reconstructed current block are used as reference samples in performing intra prediction of the next block in order.

The filter unit 380 deblock-filters the boundaries between the reconstructed blocks in order to remove blocking artifacts caused by block-by-block encoding/decoding and stores the blocks in the memory 390. When all the blocks in one picture are reconstructed, the reconstructed picture is used as a reference picture for inter prediction of a block in a subsequent picture to be encoded.

Figure 7:
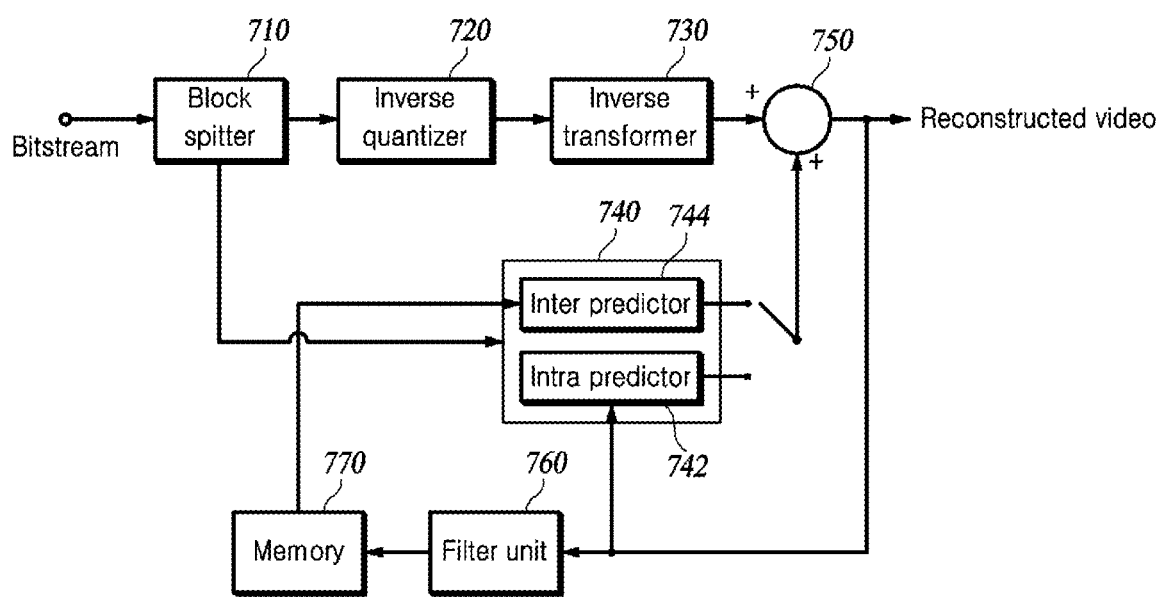
FIG. 7 illustrates a video decoding apparatus in which techniques of the present disclosure can be implemented.

FIG. 7 illustrates a video decoding apparatus in which techniques of the present disclosure can be implemented.

Figure 2:
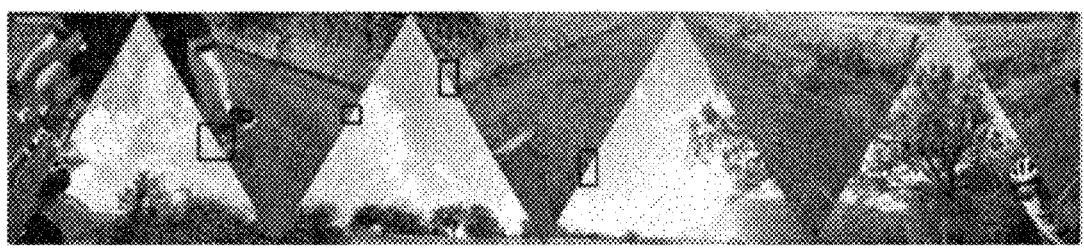
FIG. 2 illustrates various two-dimensional layouts of octahedron projection (OHP).

The video decoding apparatus includes a decoder 710, an inverse quantizer 720, an inverse transformer 730, a predictor 740, an adder 750, a filter unit 760, and a memory 770. As in the case of the video encoding apparatus of FIG. 2, each element of the video decoding apparatus may be implemented as a hardware chip, or may be implemented as software, and the microprocessor may be implemented to execute the functions of the software corresponding to the respective elements.

The decoder 710 decodes a bitstream received from the video encoding apparatus, extracts information related to block splitting to determine a current block to be decoded, and extracts prediction information necessary to reconstruct the current block and information about a residual signal.

The decoder 710 extracts information about the CTU size from the sequence parameter set (SPS) or the picture parameter set (PPS), determines the size of the CTU, and splits a picture into CTUs of the determined size. Then, the decoder determines the CTU as the uppermost layer, that is, the root node, of a tree structure, and extracts split information about the CTU to split the CTU using a tree structure. For example, when the CTU is split using the QTBT structure, a first flag (QT_split_flag) related to the QT split is first extracted and each node is split into four nodes of a lower layer. For a node corresponding to a leaf node of the QT, a second flag (BT_split_flag) and a split type related to the BT split are extracted to split the leaf node of the QT in the BT structure.

In the example of the block split structure of FIGS. 4A and 4B, QT_split_flag corresponding to the node of the uppermost layer of the QTBT structure is extracted. Since the value of the extracted QT_split_flag is 1, the node of the uppermost layer is split into four nodes of a lower layer (layer 1 of QT). Then, the QT_split_flag for the first node of layer 1 is extracted. Since the value of the extracted QT_split_flag is 0, the first node of layer 1 is not further split in the QT structure.

Since the first node of layer 1 of the QT is a leaf node of the QT, the operation precedes to a BT which takes the first node of layer 1 of QT as a root node of the BT. BT_split_flag corresponding to the root node of the BT, that is, '(layer 0)', is extracted. Since BT_split_flag is 1, the root node of the BT is split into two nodes of '(layer 1)'. Since the root node of the BT is split, split type information indicating whether the block corresponding to the root node of the BT is vertically split or horizontally split is extracted. Since the split type information is 1, the block corresponding to the root node of the BT is vertically split. Then, the decoder 710 extracts BT_split_flag for the first node of '(layer 1)' which is split from the root node of the BT. Since BT_split_flag is 1, the split type information about the block of the first node of '(layer 1)' is extracted. Since the split type information about the block of the first node of '(layer 1)' is 1, the block of the first node of '(layer 1)' is vertically split. Then, BT_split_flag of the second node of '(layer 1)' split from the root node of the BT is extracted. Since BT_split_flag is 0, the node is not further split by the BT.

For example, when BT_split_flag=1 for the first node of '(layer 1)' split from the root node of the BT is extracted and the split type information (0) is extracted, the block of the first node of '(layer 1)' is horizontally split. Then, BT_split_flag of the second node of '(layer 1)' is extracted from the root node of the BT. If BT_split_flag is 1, the split type information is automatically set to 1 and not extracted anymore, and the block of the second node of '(layer 1)' is vertically split.

In this way, the decoder 710 recursively extracts QT_split_flag and splits the CTU in the QT structure. The decoder extracts BT_split_flag for a leaf node of the QT. When BT_split_flag indicates splitting, the split type information is extracted. In this way, the decoder 710 may confirm that the CTU is split into a structure as shown in FIG. 4A.

When information such as MinQTSize, MaxBTSize, MaxBTDepth, and MinBTSize is additionally defined in the SPS or PPS, the decoder 710 extracts the additional information and uses the additional information in extracting split information about the QT and the BT.

In the QT, for example, a block having the same size as MinQTSize is not further split. Accordingly, the decoder 710 does not extract the split information (the QT split flag) related to the QT of the block from the bitstream (i.e., there is no QT split flag of the block in the bitstream), and automatically sets the corresponding value to 0. In addition, in the QT, a block having a size larger than MaxBTSize does not have a BT. Accordingly, the decoder 710 does not extract the BT split flag for a leaf node having a block larger than MaxBTSize in the QT, and automatically sets the BT split flag to 0. Further, when the depth of a corresponding node of BT reaches MaxBTDepth, the block of the node is not further split. Accordingly, the BT split flag of the node is not extracted from the bit stream, and the value thereof is automatically set to 0. In addition, a block having the same size as MinBTSize in the BT is not further split. Accordingly, the decoder 710 does not extract the BT split flag of the block having the same size as MinBTSize from the bitstream, and automatically sets the value of the flag to 0.

In an embodiment, upon determining a current block to be decoded through splitting of the tree structure, the decoder 710 extracts information about the prediction type indicating whether the current block is intra-predicted or inter-predicted.

When the prediction type information indicates intra prediction, the decoder 710 extracts syntax elements for the intra prediction information (intra mode) about the current block. First, the decoder 710 extracts mode information (i.e., MPM flag) indicating whether the intra mode of the current block is selected from among the MPMs. In general, when the intra mode encoding information indicates that the intra mode of the current block is selected from among the MPMs, the decoder extracts first intra prediction information for indicating which mode of the MPMs is selected as the intra mode of the current block. When the intra mode encoding information indicates that the intra mode of the current block is not selected from among the MPMs, the decoder extracts second intra identification information for indicating which of the modes excluding the MPMs is selected as the intra mode of the current block.

The decoder 710 extracts information about the quantized transform coefficients of the current block as information about the residual signal.

The inverse quantizer 720 inversely quantizes the quantized transform coefficients. The inverse transformer 730 inversely transforms the inversely quantized transform coefficients from the frequency domain to the spatial domain to reconstruct the residual signals, and thereby generates a residual block for the current block.

The predictor 740 includes an intra predictor 742 and an inter predictor 744. The intra predictor 742 is activated when the prediction type of the current block is intra prediction, and the inter predictor 744 is activated when the prediction type of the current block is inter prediction.

The intra predictor 742 determines an intra mode of the current block among the plurality of intra prediction modes from the syntax element for the intra prediction mode extracted from the decoder 710, and predicts the current block using reference samples around the current block according to the intra prediction mode To determine the intra prediction mode of the current block, the intra predictor 742 constructs an MPM list including a predetermined number of MPMs from the neighboring blocks around the current block. The method of constructing the MPM list is the same as that for the intra predictor 322 of FIG. 3.

Generally, when the intra prediction mode information (i.e., the MPM flag) indicates that the intra mode of the current block is selected from among the MPMs, the intra predictor 742 selects, as the intra mode of the current block, the MPM indicated by the first intra identification information among the MPMs in the MPM list. On the other hand, when the mode information indicates that the intra mode of the current block is not selected from among the MPMs, intra predictor 742 selects the intra mode of the current block among the intra modes other than the MPMs in the MPM list, using the second intra identification information.

The inter predictor 744 determines the motion information about the current block using the syntax elements for the inter mode extracted by the decoder 710, and predicts the current block using the determined motion information.

The adder 750 adds the residual block output from the inverse transformer and the prediction block output from the inter predictor or intra predictor to reconstruct the current block. The pixels in the reconstructed current block are utilized as reference samples for intra prediction of a block to be decoded later.

The filter unit 760 deblock-filters the boundaries between the reconstructed blocks in order to remove blocking artifacts caused by block-by-block decoding and stores the deblock-filtered blocks in the memory 390. When all the blocks in one picture are reconstructed, the reconstructed picture is used as a reference picture for inter prediction of blocks in a subsequent picture to be decoded.

The techniques described below relate to intra coding. The techniques of the present disclosure may be carried out, for example, by the video encoding apparatus and the video decoding apparatus shown and described with reference to FIGS. 3 and 7. That is, in one example, the intra predictor described with reference to FIG. 3 may carry out predetermined techniques described below in performing intra prediction while encoding blocks of video data. In another example, the intra predictor described with reference to FIG.

7 may carry out predetermined techniques described below in performing intra prediction while decoding blocks of video data.

Figure 9A:
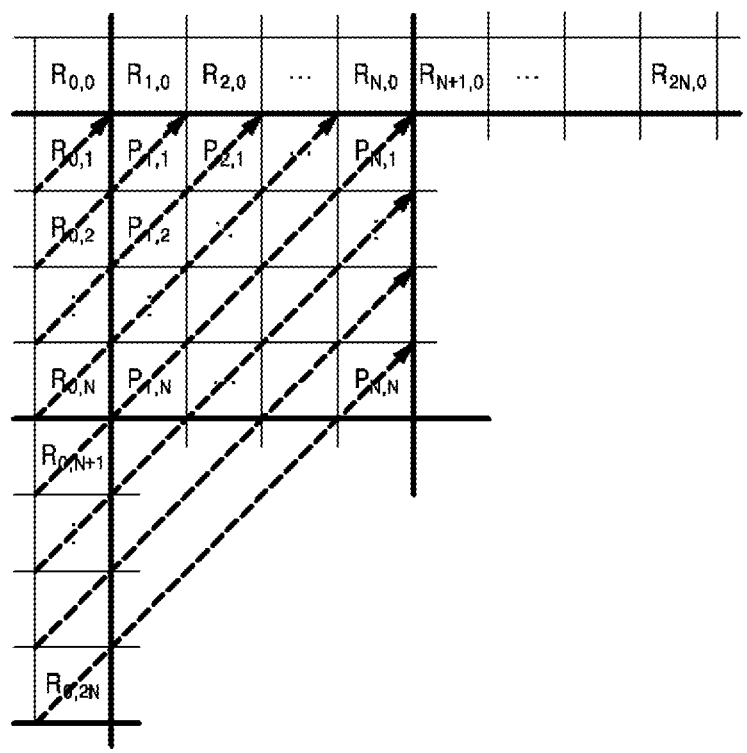
FIGS. 9A and 9B are conceptual diagrams illustrating how reference samples are used for a current block in a directional intra mode.
Figure 9B:
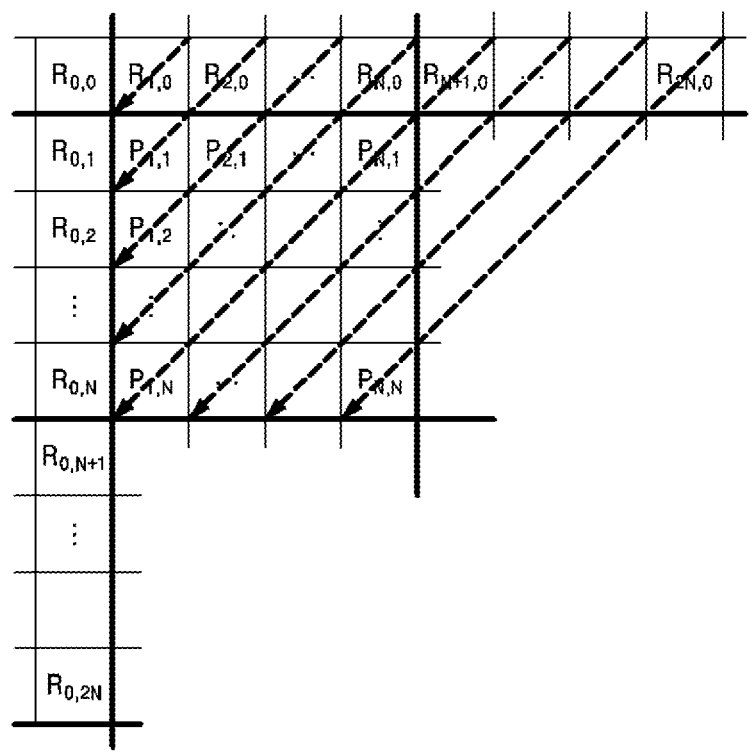

FIG. 8 is a diagram showing a positional relationship between a current block and reference samples in intra prediction. In the conventional general directional and non-directional modes, prediction pixel values for the current block are determined using the left reference pixels $R_{0,1}$, $R_{0,2}, R_{0,3}, \ldots, R_{0,2N}$ and the top reference pixels $R_{1,0}, R_{2,0}, R_{3,0}, \ldots, R_{2N,0}$. FIGS. 9A and 9B are conceptual diagrams illustrating how reference samples are used for a current block in a directional intra mode. As illustrated in FIGS. 9A and 9B, the prediction block for the current block is uniquely generated according to the directionality of the selected intra mode.

The present disclosure relates to intra prediction techniques which are usefully operable in blocks that have diagonal edges or different diagonal textures. In the new intra mode proposed in the present disclosure, the current block to be predicted is split into two areas, and each of the areas may be individually predicted according to the directional or non-directional mode illustrated in FIG. 5. The new intra mode proposed in this disclosure may be referred to as a "split intra mode" in the following description.

The split intra mode includes a first type (referred to as "Split_right_down type"), in which two areas are distinguished by a diagonal line connecting the upper left corner and the lower right corner of a block, and a second type (referred to as "Split_right_up type"), in which two areas are distinguished by a diagonal line connecting the lower left corner and the upper right corner of a block. As shown in FIGS. 10A, 10B, 11A and 11B, in the split intra mode, two areas are distinguished by a diagonal line crossing the current block. FIGS. 10A and 10B are diagrams illustrating two types of split intra mode for a square block, and FIGS. 11A and 11B are diagrams illustrating two types of split intra mode for a rectangular block.

Figure 12A:
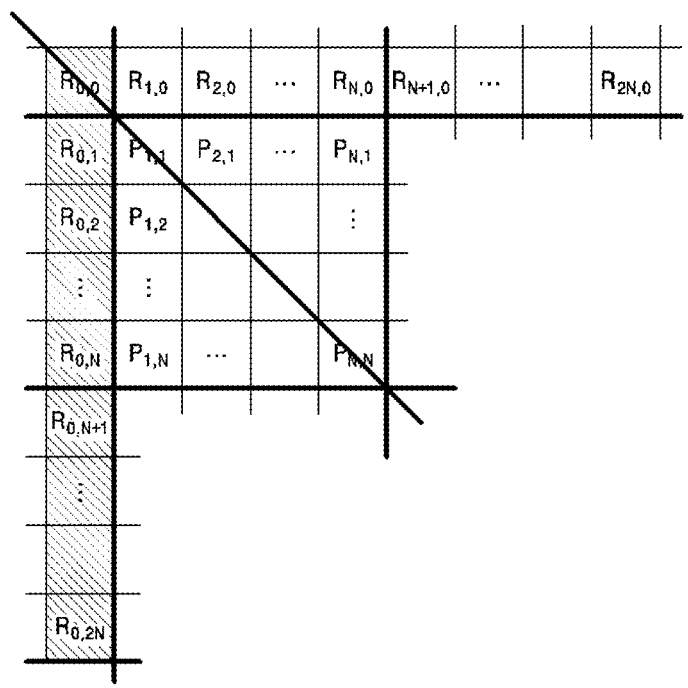
FIGS. 12A, 12B, 12C and 12D are diagrams for explaining reference pixels used for two areas of a current block in a split intra mode.
Figure 12B:
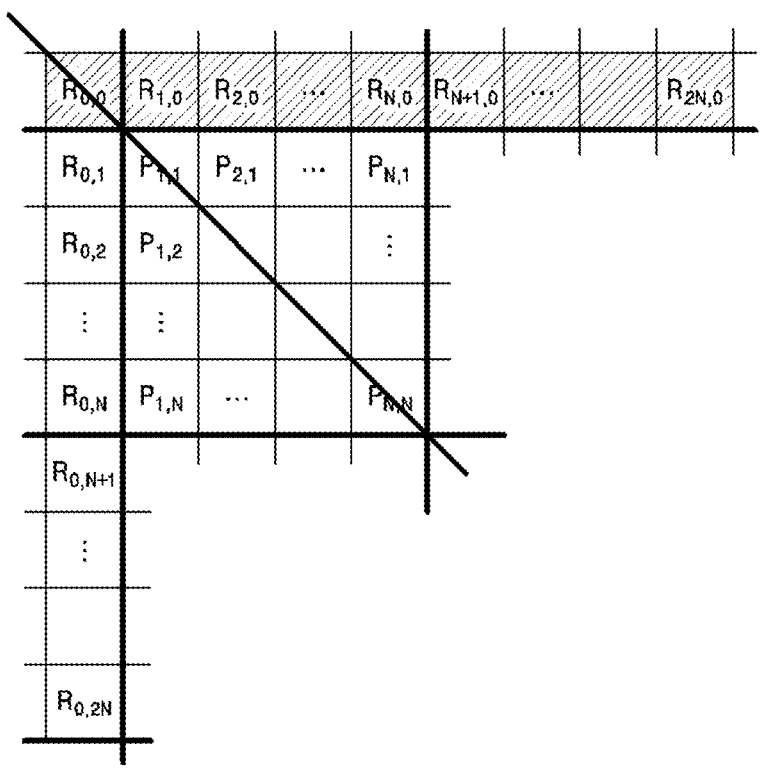

FIGS. 12A and 12B show diagrams for explaining reference pixels used for two areas of a current block in a split intra mode of the Split_right_down type. In the Split_right_down type, prediction pixel values for the lower left area of the current block are determined using the left reference pixels $R_{0,1}, R_{0,2}, R_{0,3}, \ldots, R_{0,2N}$ (the hatched pixels in FIG. 12A), and prediction pixel values for the upper right area are determined using the upper reference pixels $R_{1,0}, R_{2,0}, R_{3,0}, \ldots, R_{2N,0}$ (the hatched pixels in FIG. 12B). Here, $R_{0,0}$ may or may not be used as a reference pixel for the two areas.

Figure 12C:
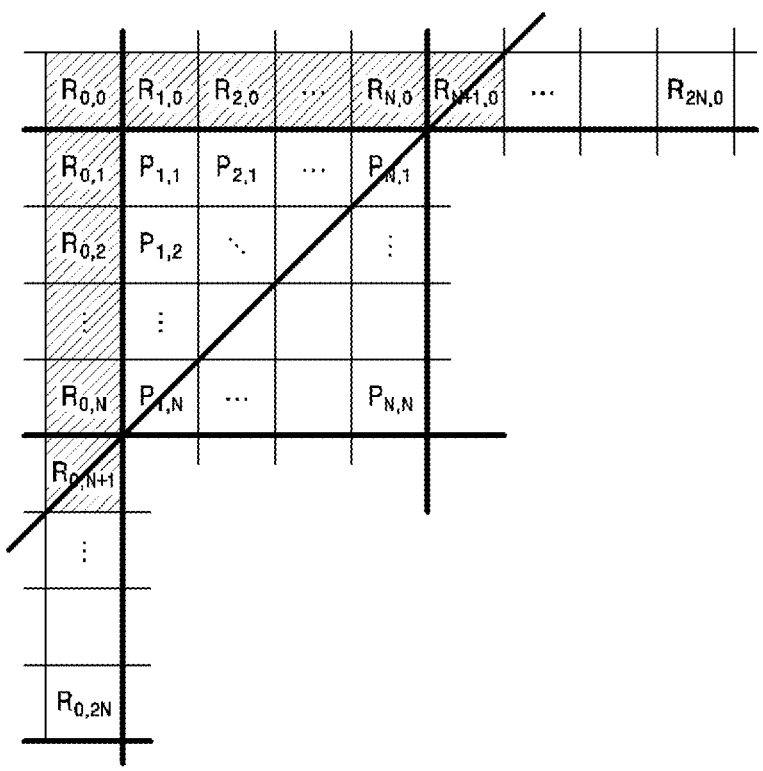
Figure 12D:
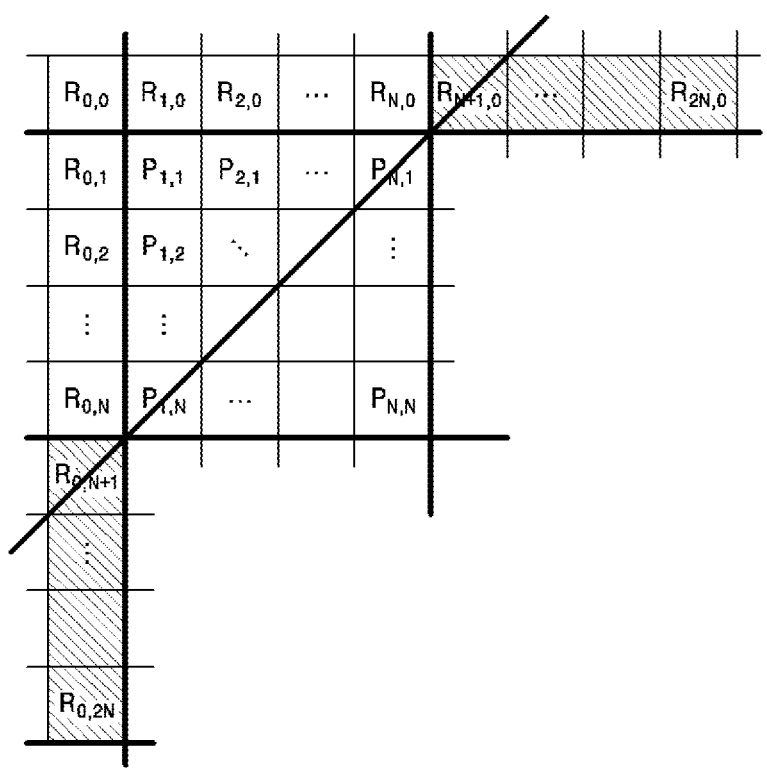

FIGS. 12C and 12D show diagrams for explaining reference pixels respectively used for two areas of a current block in the split intra mode of the Split_right_up type. In the Split_right_up type, prediction pixel values for the upper left area are determined using left and above reference pixels $\{R_{0,0}, R_{0,1}, R_{0,2}, R_{0,3}, \ldots, R_{0,N}\}$ and $\{R_{1,0}, R_{2,0}, R_{3,0}, \ldots, R_{N,0}\}$ (the hatched pixels in FIG. 12C) adjacent to the corresponding block, and prediction pixel values for the lower right area are determined using left and above reference pixels $\{R_{0,N+1}, R_{0,N+2}, R_{0,N+3}, \ldots, R_{0,2N}\}$ and $\{R_{N+1,0}, R_{N+2,0}, R_{N+3,0}, \ldots, R_{2N,0}\}$ (the hatched pixels in FIG. 12D) which are not adjacent to the corresponding block. Here, $R_{0,N+1}$ and $R_{N+1,0}$ may or may not be used as reference pixels for the two areas. Alternatively, $R_{0,N+1}$ and $R_{N+1,0}$ may be used only to generate prediction pixel values on the diagonal line. That is, the prediction pixel values on the diagonal line may be determined based on $R_{0,N+1}$ and $R_{N+1,0}$.

In some embodiments, each mode to be used for prediction of the two areas in the split intra mode may be fixed. That is, one or two modes selected from among the directional or non-directional modes illustrated in FIG. 5 may be assigned to the respective areas as the default modes. The default modes assigned to the two areas may have the same directionality or may have opposite directionalities. In addition, the default modes assigned to the two areas may be the planar or DC mode, which is a non-directional mode. For example, in the Split_right_down type, prediction pixel values for the lower left area of the current block may be determined according to the DC mode using the left reference pixels, and prediction pixel values for the upper right area may be determined according to the DC mode using the above reference pixels. In some other embodiments, the default modes assigned to the two areas may have directionality illustrated in FIGS. 13A and 13B.

In some other embodiments, the respective modes to be used for prediction of the two areas in the split intra mode may be selected by the video encoding apparatus from among the directional or non-directional modes illustrated in FIG. 5, in consideration of compression efficiency and the like.

Figure 13A:
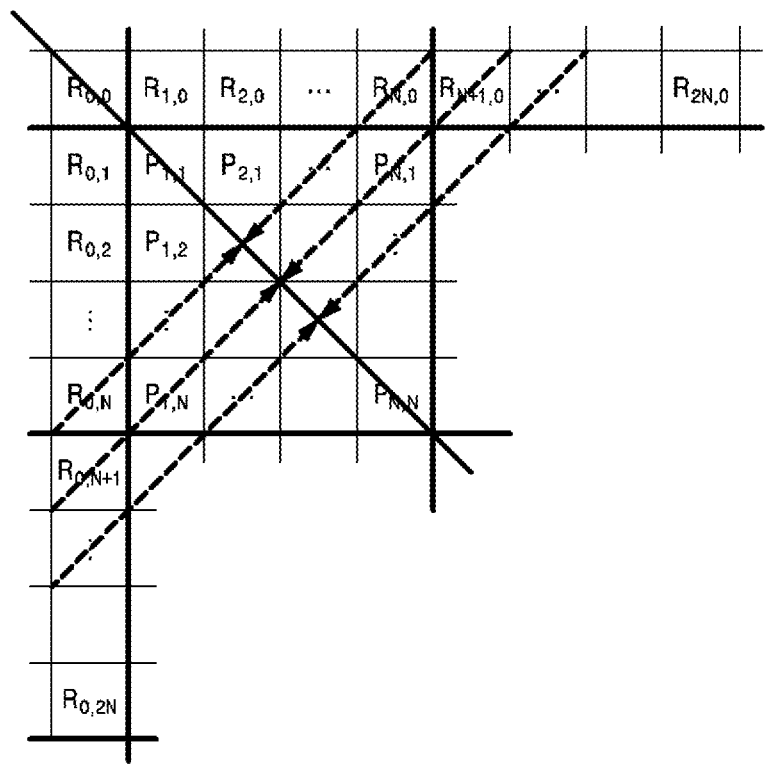
FIGS. 13A, 13B, 14A, and 14B are conceptual diagrams illustrating some exemplary methods by which reference samples are used for two areas in a split intra mode.
Figure 13B:
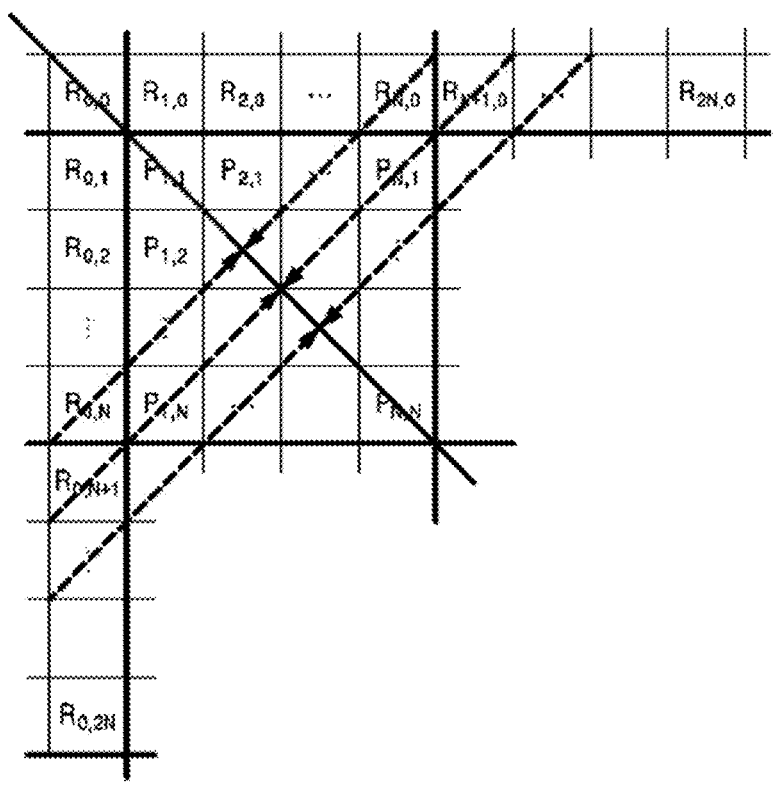
Figure 14A:
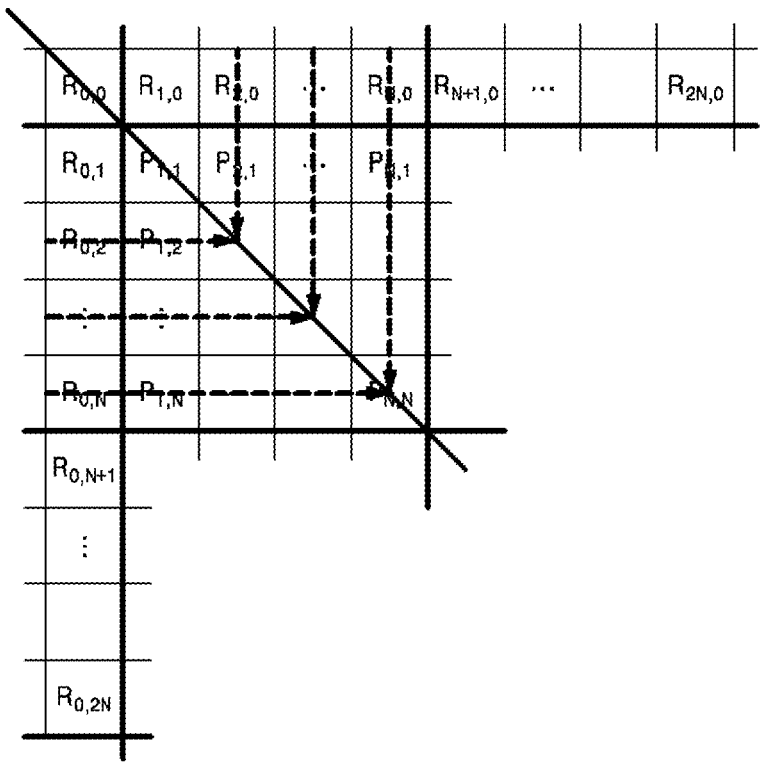
Figure 14B:
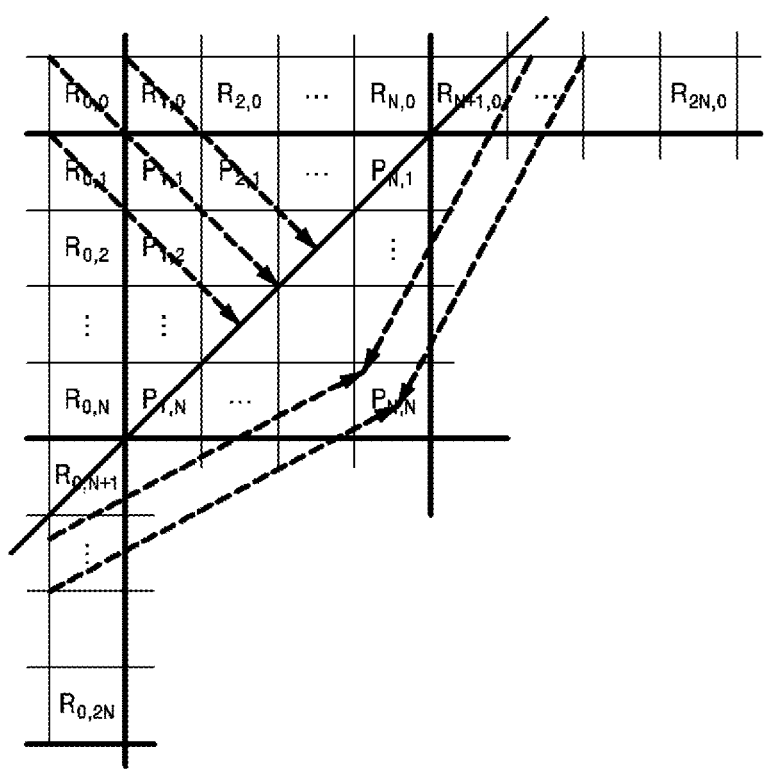

FIGS. 13A, 13B, 14A, and 14B are conceptual diagrams illustrating some exemplary methods by which reference samples are used for two areas in a split intra mode. In the example of FIG. 13A, the two areas are predicted with opposite directionalities. In the example of FIG. 13B, predictions of the two areas have the same directionality. In the example of FIGS. 14A and 14B, predictions of the two areas have different directionalities. In particular, the prediction illustrated in FIG. 13B has bi-directionalities. In other words, one prediction pixel value is calculated using the values of two reference pixels, one of which is selected among the left reference pixels $R_{0,0}, R_{0,1}, R_{0,2}, R_{0,3}, \ldots, R_{0,2N}$ in an upward direction (at the same angle as the angle of the diagonal line) and another of which is selected among the above reference pixels $R_{1,0}, R_{2,0}, R_{3,0}, \ldots, R_{2N,0}$ in a downward direction (at the same angle as the angle of the diagonal line). That is, each pixel in the current block is predicted using the left reference pixel and the above reference pixel located on a straight line parallel to the diagonal line dividing the current block into two areas. In other words, the prediction pixel and the two reference pixels used to predict a pixel value are placed on a straight line parallel to the diagonal line dividing the current block into two areas. For example, a prediction pixel $P_{1,1}$ is predicted using a left reference pixel $R_{0,2}$ and an above reference pixel $R_{2,0}$. A prediction pixel $P_{N,1}$ (or $P_{1,N}$) is predicted using a left reference pixel $R_{0,N+1}$ and an above reference pixel $R_{N+1,0}$. A prediction pixel $P_{N,N}$ is predicted using a left reference pixel $R_{0,2N}$ and an above reference pixel $R_{2N,0}$. Here, in predicting one prediction pixel value using two reference pixels, a weight corresponding to the distance from the location of the prediction pixel to the location of a corresponding reference pixel may be assigned to the reference pixel values. For example, the pixel value of the prediction pixel $P_{N,1}$ may be determined as a value closer to $R_{N+1,0}$ than to $R_{0,N+1}$.

The following four methods may be considered in signaling that the split intra mode has been selected for the current block.

The first method is to signal split_right_down and split_right_up respectively as new intra modes. For example, when the two new intra modes are added to a existing video codec standard having n existing intra modes, the split_right_down type and the split_right_up type may become an (n+1)-th mode and a (n+2)-th mode, or an (n+2)-th mode and an (n+1)-th mode, respectively. The two newly added modes are signaled in the same way as the other existing modes.

The second method is to signal split_right_down and split_right_up as one split_intra_mode. For example, when the one intra mode is added to the video codec standard having n existing intra modes, the split_intra_mode may become the (n+1)-th mode. The newly added mode is signaled in the same manner as the other existing modes. Here, when the (n+1)-th mode is selected, a 1-bit flag is additionally used to signal whether the mode is split_right_down or split_right_up.

The third method is to signal split_right_down and split_right_up as one split_intra_mode. For example, when the one intra mode is added to a video standard having n existing intra modes, the split_intra_mode may become the (n+1)-th mode. Here, the added mode is signaled in the same manner as the other existing modes. Here, when the (n+1)-th mode is selected, whether the mode is split_right_down or split_right_up is derived from the values of the reference pixels by the video decoding apparatus without signaling of a separate syntax element.

When split_right_down has been selected as the type of a split intra mode of a given block, note that the lower left area of the current block has a different texture than the lower right area, and accordingly the reference pixels adjacent to the lower left area are very likely to have a different value from the reference pixels adjacent to the upper right area. Accordingly, the video decoding apparatus can infer that split_right_down is used if Equation 1 below is satisfied. Otherwise, the video decoding apparatus may infer that split_right_up is selected.

$$\left| \frac{\sum_{i=1}^{2N} R_{0,i}}{2N} - \frac{\sum_{i=1}^{2N} R_{i,0}}{2N} \right| \geq \left| \frac{\left(\sum_{i=1}^{N} R_{0,i} - \sum_{i=1}^{N} R_{i,0}\right)}{2N} - \frac{\left(\sum_{i=N+1}^{2N} R_{0,i} - \sum_{i=N+1}^{2N} R_{i,0}\right)}{2N} \right|$$

Equation 1

In Equation 1, the left side represents the difference between the average of the left reference pixels ($R_{0,1}$, $R_{0,2}$, $R_{0,3}$, ..., $R_{0,2N}$) for the lower left area and the average of the above reference (pixels $R_{1,0}$, $R_{2,0}$, $R_{3,0}$, ..., $R_{2N,0}$) for the upper right area when split_right_down is applied.

In Equation 1, the right side represents the difference between the average of the left and above reference pixels ($R_{0,0}$, $R_{0,1}$, $R_{0,2}$, $R_{0,3}$, ..., $R_{0,N}$, and $R_{1,0}$, $R_{2,0}$, $R_{3,0}$, ..., $R_{N,0}$) which are adjacent to the current block, for the upper left area and the average of the left and above reference pixels ($R_{0,N+1}$, $R_{0,N+2}$, $R_{0,N+3}$, ..., $R_{0,2N}$, and $R_{N+1,0}$, $R_{N+2,0}$, $R_{N+3,0}$, ..., $R_{2N,0}$) which are not adjacent to the current block, for the lower right area when split_right_up is applied.

In Equation 1, the 2N reference pixels are considered. Alternatively, a similar technique may be applied to N reference pixels selected from among the 2N reference pixels in order to reduce the computational load. For example, the similar technique may be applied to reference pixels configured by selecting one pixel from every two pixels, for example, pixels 0, 2, 4, 6, 8, 10, ... or pixels 1, 3, 5, 7, 9, ....

The fourth method is to replace one of split_right_down or split_right_up with an existing intra mode. For example, split_right_up may be used in place of the existing DC mode. In this case, split_right_up may be one (diagonal planar mode) of the non-directional modes. As a result, the intra mode may include two non-directional modes including the conventional (vertical/horizontal) planar mode and the diagonal planar mode and 65 directional modes. The diagonal planar mode may replace the DC mode in all the encoding/decoding operations including the MPM setting operation described with reference to FIGS. 3 to 7.

In the split intra mode(s), when modes for the two areas of the current block are selected by the video encoding apparatus from among a plurality of intra modes including the directional and non-directional modes, additional signaling for the respective modes applied to the two areas is necessary. On the other hand, when a default mode is assigned to the two areas for the split intra mode, only information on whether the split intra mode is applied to the current block needs to be signaled.

When prediction pixel values are generated in the split intra mode, the prediction pixel values lying on a diagonal line dividing the two areas may be determined using reference samples in one of the areas. That is, the pixels on the diagonal line may be included in one of the areas and predicted in the same mode as the other pixels in the area. Alternatively, pixels on the diagonal line may be determined using both the reference samples of the two areas.

Figure 15A:
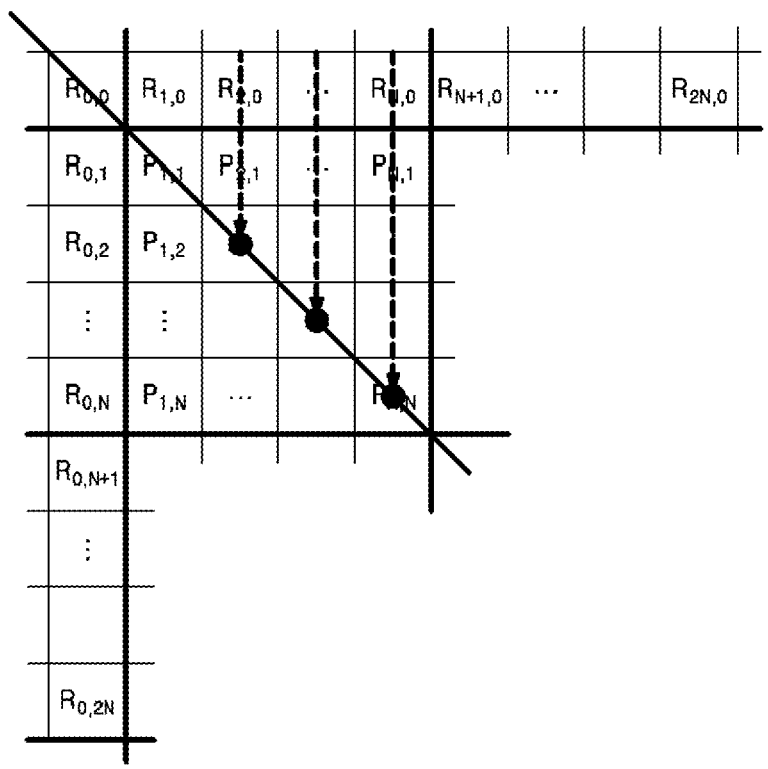
FIGS. 15A to 15C are conceptual diagrams illustrating methods of determining prediction pixel values on a diagonal line in a split intra mode of a split_right_down type.
Figure 15B:
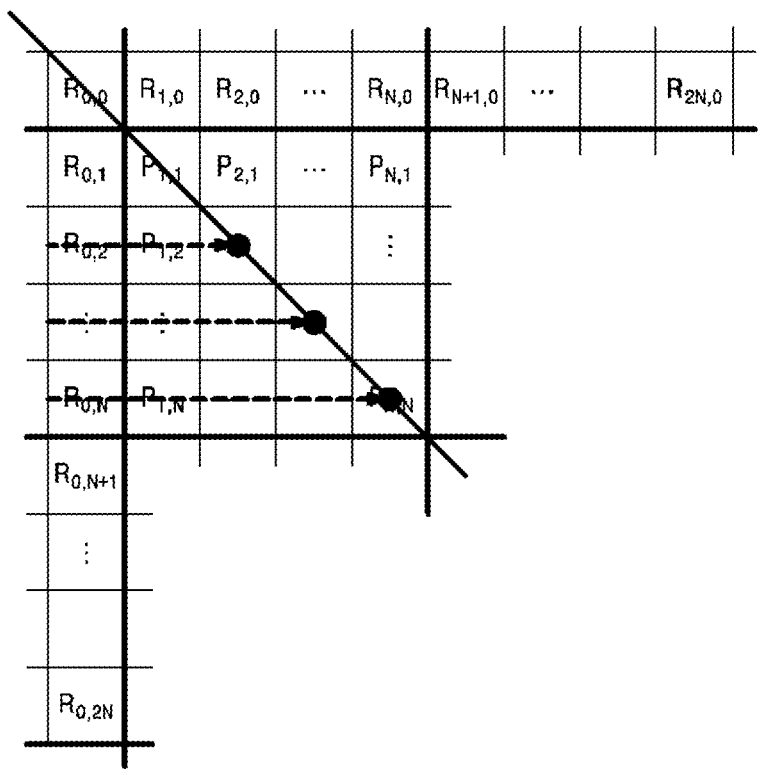
Figure 15C:
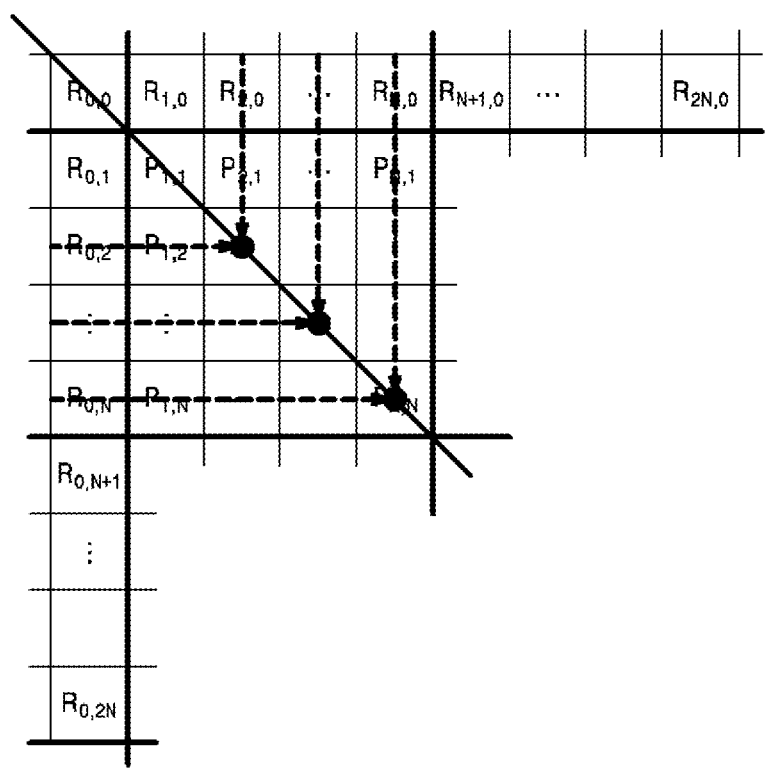

FIGS. 15A to 15C are conceptual diagrams illustrating methods of determining prediction pixel values on a diagonal line in a split intra mode of a split_right_down type. FIG. 15A illustrates a method of determining prediction pixel values on the diagonal line using reference samples for the upper right area, and FIG. 15B illustrates a method of determining prediction pixel values on the diagonal line using reference samples for the lower left area, and FIG. 15C illustrates a method of determining prediction pixel values on the diagonal line using reference samples for the upper right area and reference samples for the lower left area together.

As described above, the split intra mode may be particularly useful for intra prediction of 360 video for which projection formats composed of triangular faces may be used. Suppose that the 360 video has been transformed into a two-dimensional image based on Icosahedral Projection (ISP) and Octahedron Projection (OHP). When the original pixel values on the diagonal line are configured with the values of the upper left area, the prediction pixels on the diagonal line should be generated using the above left reference sample. When the original pixel values on the diagonal are configured with the values of the lower right area, the prediction pixels should be generated using the bottom right reference sample values. In the case where information about how the original pixel values on the diagonal line are filled is not known, the prediction pixels may be generated using both the above left and bottom right reference sample values. Alternatively, the video encoding apparatus and the video decoding apparatus may generate prediction pixel values on the diagonal line using the reference samples of a predetermined area in the same manner. Alternatively, the video encoding apparatus may generate prediction pixel values on the diagonal line using reference samples of a specific (either upper left or lower right) area, and then explicitly signal information on which area has been used.

The split intra mode(s) may be activated/deactivated by a flag indicating enabling/disabling of the split intra mode(s). The split intra mode(s) may be enabled/disabled by a flag indicating 360 video. The split intra mode may be enabled/ disabled by a syntax element that indicates the projection format used for the two-dimensional representation of the 360 video. As described above, the split intra mode(s) may or may not be included in a plurality of available intra modes, as necessary.

Figure 16:
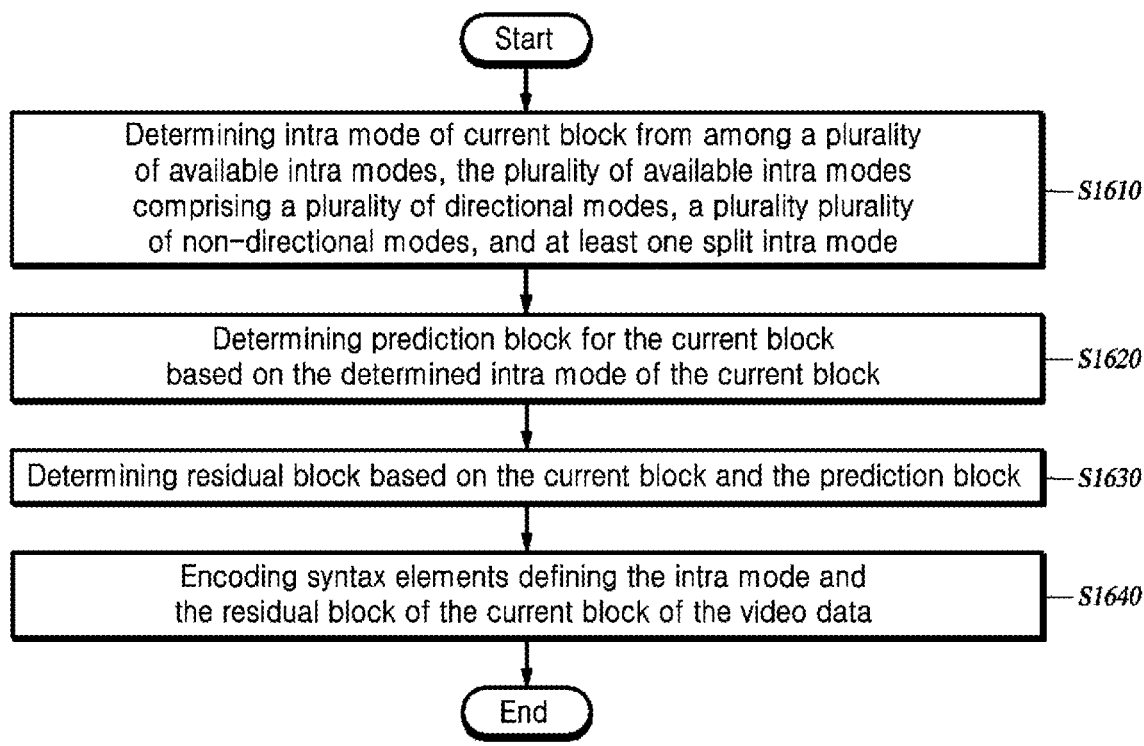
FIG. 16 is a flowchart illustrating an exemplary method of encoding video data in accordance with one or more examples of the present invention.

FIG. 16 is a flowchart illustrating an exemplary method of encoding video data in accordance with one or more examples of the present invention.

The video encoding apparatus determines an intra mode for predicting a current block of video data among a plurality of available intra modes (S1610). Herein, the plurality of available intra modes includes a plurality of directional modes, a plurality of non-directional modes, and at least one split intra mode. In the split intra mode(s), a prediction block for the current block is individually predicted for each of the two areas (i.e., a first area and a second area) split by diagonally splitting the current block. For prediction for each area, respective one of the plurality of directional modes and the plurality of non-directional modes is applied. One directional or non-directional mode may be applied to the two areas in common. Alternatively, a mode different from the mode applied to the first area may be applied to the second area. A mode applied to the first area and a mode applied to the second area may be preset among the plurality of directional or non-directional modes. One or two modes selected from among the plurality of directional or non-directional modes may be assigned as the default modes to the respective areas of the split intra mode. The default modes assigned to the two areas may have the same directionality, have opposite directionalities, or have both directionalities. In addition, the default modes assigned to the two areas may be the planar or DC mode, which is a non-directional mode. In some other embodiments, the respective modes to be used for prediction of the two areas in the split intra mode may be selected by the video encoding apparatus from among the directional or non-directional modes illustrated in FIG. 5, in consideration of compression efficiency and the like.

In some embodiments, a plurality of available intra modes may have two split intra modes, that is, a first split intra mode, in which two areas are divided by a diagonal line connecting the upper left corner and the lower right corner of a current block, and a second split intra mode, in which two areas are divided by a diagonal line connecting the lower left corner and the upper right corner of the current block.

In some other examples, the plurality of available intra modes may have one split intra mode. Here, the one split intra mode may have a first type, in which two areas are divided by a diagonal line connecting the upper left corner and the lower right corner of the current block, and a second type, in which two areas are divided by a diagonal line connecting the lower left corner and the upper right corner of the current block.

Next, the video encoding apparatus determines a prediction block for the current block based on the determined intra mode of the current block (S1620). In the split intra modes, at least a portion of the reference pixels used to determine the prediction pixels for the first area are different from the reference pixels used to determine the prediction pixels for the second area.

For example, when the first split intra mode is determined as the intra mode of the current block, at least a portion of the reference samples used to determine the prediction pixels for the first area (lower left area) between the two areas of the current block is selected on the left block (L) and the bottom left block (BL) of the current block, and at least a portion of the reference samples used to determine the prediction pixels for the second area (upper right area) are selected on the above block (A) and the above right block (AR).

When the second split intra mode is determined to be the intra mode of the current block, at least a part of the reference samples used in determining the prediction pixels for the first one (the upper left area) of the two areas is selected on the left block (L) and the above block (A) of the current block, and at least a part of the reference samples used in determining the prediction pixels for the second area (the lower right area) is selected on the bottom left block (BL) and the above right block (AR).

The video encoding apparatus determines a residual block based on the current block and the prediction block (S1630). The video encoding apparatus encodes syntax elements defining the intra mode and the residual block of the current block (S1640). When the split intra mode is determined as the intra mode of the current block, the video encoding apparatus may further encode syntax elements defining respective one of a plurality of directional modes and a plurality of non-directional modes applied to each of the two areas.

Figure 17:
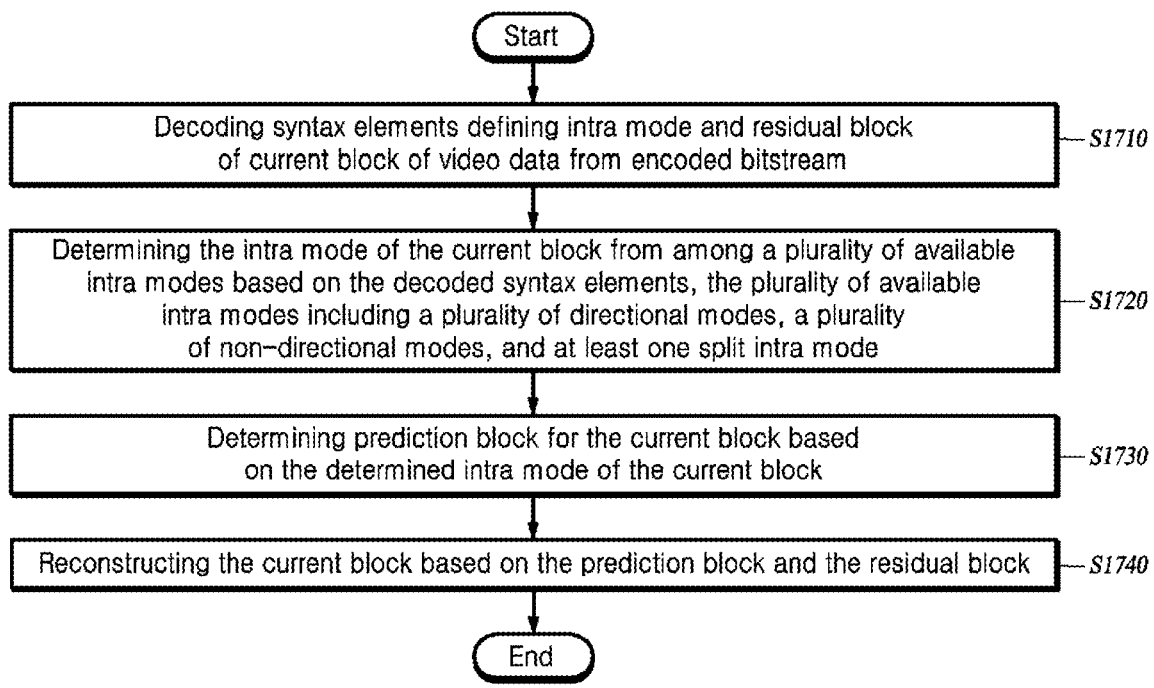
FIG. 17 is a flowchart illustrating an exemplary method of decoding video data in accordance with one or more examples of the present invention.

FIG. 17 is a flowchart illustrating an exemplary method of decoding video data in accordance with the above-described one or more examples of the present invention.

The video decoding apparatus decodes the syntax elements defining the intra mode and the residual block for the current block of the video data from the encoded bitstream (S1710).

Next, based on the decoded syntax elements, the video decoding apparatus determines an intra mode for predicting the current block of the video data among a plurality of available intra modes (S1720). Herein, the plurality of available intra modes includes a plurality of directional modes, a plurality of non-directional modes, and at least one split intra mode. When the split intra mode(s) is determined as the intra mode of the current block, the video decoding apparatus further decodes the syntax elements defining respective one of the plurality of directional modes and the plurality of non-directional modes applied to each of the two areas from the encoded bitstream.

Next, the video decoding apparatus determines a prediction block for the current block based on the determined intra mode of the current block (S1730).

Next, the video decoding apparatus reconstructs the current block based on the determined prediction block and the residual block (S1740).

Although exemplary embodiments of the present disclosure have been described for illustrative purposes, those skilled in the art will appreciate that various modifications, additions and substitutions are possible, without departing from the idea and scope of the claimed invention. Exemplary embodiments of the present disclosure have been described for the sake of brevity and clarity. Accordingly, one of ordinary skill would understand the scope of the disclosure is not limited by the explicitly described above embodiments but is inclusive of the claims and equivalents thereof.

What is claimed is:

1. A method for decoding video data, comprising:
   decoding syntax elements defining an intra mode and a residual block of a current block of the video data from an encoded bitstream;
   determining the intra mode of the current block from among a plurality of available intra modes based on the decoded syntax elements defining the intra mode of the current block, wherein the plurality of available intra modes comprises a plurality of directional modes, a plurality of non-directional modes, and a plurality of split intra modes, wherein, in the split intra modes, respective one of the plurality of directional modes and the plurality of non-directional modes is individually applied to each of two areas divided by diagonally splitting the current block;

determining a prediction block for the current block using pixel values of pre-decoded pixels in left, bottom-left, above, and above-right blocks of the current block, based on the determined intra mode of the current block; and reconstructing the current block based on the prediction block and the residual block, wherein the plurality of split intra modes comprises
 a first split intra mode in which the current block is split into the two areas by a diagonal line connecting an upper left corner and a lower right corner of the current block, and
 a second split intra mode in which the current block is split into the two areas by a diagonal line connecting a lower left corner and an upper right corner of the current block, and wherein the determining of the prediction block comprises at least one of:
 (i) when the intra mode of the current block is equal to the first split intra mode, predicting pixel values of one of the two areas from pixel values of pre-decoded pixels in the left block and the bottom-left block, and predicting pixel values of the other of the two areas from pixel values of pre-decoded pixels in the above block and the above-right block, or
 (ii) when the intra mode of the current block is equal to the second split intra mode, predicting pixel values of one of the two areas from pixel values of pre-decoded pixels in the left block and the above block, and predicting pixel values of the other of the two areas from pixel values of pre-decoded pixels in the bottom-left block and the above-right block.

2. The method of claim 1, wherein, in the first split intra mode and the second split intra mode, a respective default mode predefined among the plurality of directional modes and the plurality of non-directional modes is applied to each of the two areas.

3. The method of claim 1, wherein the determining of the prediction block comprises: decoding syntax elements defining respective one among the plurality of directional modes and the plurality of non-directional modes applied to each of the two areas from the encoded bitstream, in response to determining the split intra modes as the intra mode of the current block.

4. A method for decoding video data, comprising:
decoding syntax elements defining an intra mode and a residual block of a current block of the video data from an encoded bitstream; determining the intra mode of the current block from among a plurality of available intra modes based on the decoded syntax elements defining the intra mode of the current block, wherein the plurality of available intra modes comprises a plurality of directional modes, a plurality of non-directional modes, and one split intra mode, wherein, in the split intra mode, respective one of the plurality of directional modes and the plurality of non-directional modes is individually applied to each of two areas divided by diagonally splitting the current block;
determining a prediction block for the current block based on the determined intra mode of the current block; and reconstructing the current block based on the prediction block and the residual block, wherein the split intra mode includes a first split type in which in which the current block is split into the two areas by a diagonal line connecting an upper left corner and a lower right corner of the current block, and a second split type in which the current block is split into the two areas by a diagonal line connecting a lower left corner and an upper right corner of the current block, and wherein, when the intra mode of the current block is equal to the split intra mode, the determining of the prediction block comprises:
 determining a type of the split intra mode among the first and second split types, based on comparison of a first difference between reference pixels of two areas split according to the first split type and a second difference between reference pixels of two areas split according to the second split type.

5. The method of claim 4, wherein the determining of the type of the split intra mode comprises:
 calculating the first difference between an average of reference pixels for a first area according to the first type mode of the current block and an average of reference pixels for a second area according to the first type mode, in response to determining the split intra mode as the intra mode of the current block;
 calculating the second difference between an average of reference pixels for a first area according to the second type mode of the current block and an average of reference pixels for a second area according to the second type mode; and determining a type of the split intra mode based on comparison of the differences.

6. The method of claim 4, wherein, in the split intra mode, at least a part of reference pixels used in determining prediction pixels for a first area of the two areas is different from reference pixels used in determining prediction pixels for a second area of the two areas.

7. An apparatus for decoding video data, comprising:
a memory; and
one or more processors,
wherein the one or more processors are configured to perform operations of:
 decoding syntax elements defining an intra mode and a residual block of a current block of the video data from an encoded bitstream;
 determining the intra mode of the current block from among a plurality of available intra modes based on the decoded syntax elements defining the intra mode of the current block, wherein the plurality of available intra modes comprises a plurality of directional modes, a plurality of non-directional modes, and at least one split intra mode, wherein, in the split intra modes, respective one of the plurality of directional modes and the plurality of non-directional modes is individually applied to each of two areas divided by diagonally splitting the current block;
 determining a prediction block for the current block using pixel values of pre-decoded pixels in left, bottom-left, above, and above-right blocks of the current block, based on the determined intra mode of the current block; and
 reconstructing the current block based on the prediction block and the residual block, wherein the determining of the prediction block comprises at least one of:
  (i) when the current block is split into the two areas by a diagonal line connecting an upper left corner and a lower right corner of the current block, predicting pixel values of one of the two areas from pixel values of pre-decoded pixels in the left block and the bottom-left block, and predicting pixel values of the other of the two areas from pixel values of pre-decoded pixels in the above block and the above-right block, or
  (ii) when the current block is split into the two areas by a diagonal line connecting a lower left corner and an upper right corner of the current block, predicting pixel values of one of the two areas from pixel values of pre-decoded pixels in the left block and the above block, and predicting pixel values of the other of the two areas from pixel values of pre-decoded pixels in the bottom-left block and the above-right block.

* * * * *